R. E. FEY.
SHIPPING BRACKET FOR VEHICLES.
APPLICATION FILED JULY 25, 1917.
1,261,113.
Patented Apr. 2, 1918.
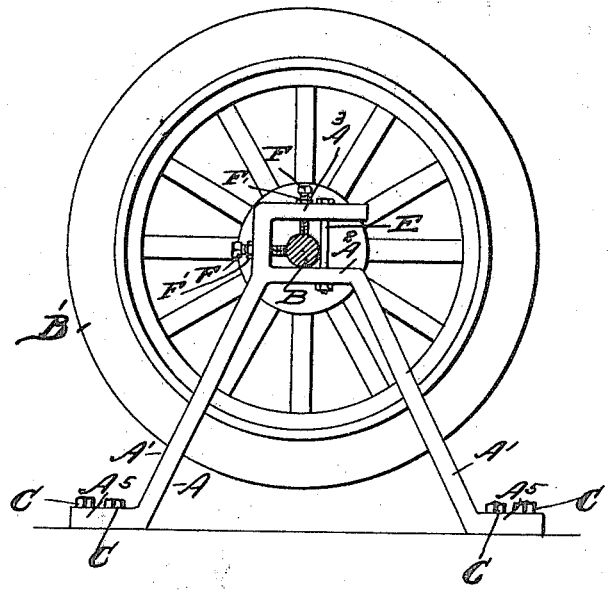
Fig. 2
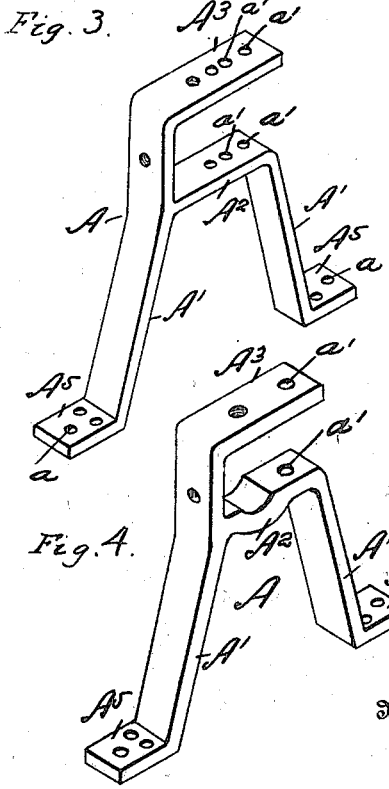
Fig. 3.
Fig. 4.
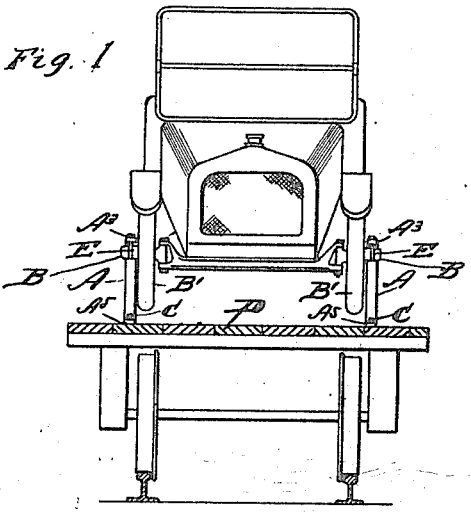
Fig. 1
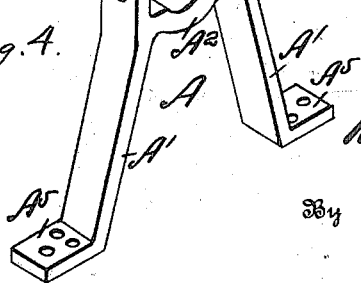
Inventor
Robert E. Fey
By J. E. Thomas
Attorney

UNITED STATES PATENT OFFICE.

ROBERT E. FEY, OF HIGHLAND PARK, MICHIGAN, ASSIGNOR OF ONE-THIRD TO MORRIS M. HERTZ AND ONE-THIRD TO HARRY J. LIPPMAN, BOTH OF DETROIT, MICHIGAN.

SHIPPING-BRACKET FOR VEHICLES.

1,261,113.     Specification of Letters Patent.     Patented Apr. 2, 1918.

Application filed July 25, 1917. Serial No. 182,625.

*To all whom it may concern:*

Be it known that I, ROBERT E. FEY, citizen of the United States, residing at Highland Park, county of Wayne, State of Michigan, have invented a certain new and useful Improvement in Shipping-Brackets for Vehicles, and declare the following to be a full, clear, and exact description of the same, such as will enable others skilled in the art to which it pertains to make and use the same, reference being had to the accompanying drawings, which form a part of this specification.

My invention relates to a shipping bracket for supporting motor driven or other vehicles for transportation upon railroad cars;—being particularly adapted for use on flat cars.

One object of this invention is to provide a device for supporting a vehicle in a slightly elevated position and against lateral movement during transportation.

Another object of the invention is to provide means for engaging either the axle or the hub of a vehicle, and which may be readily adjusted to meet the requirements of different forms and sizes of axles, or hub constructions.

With the foregoing and other objects in view, which will appear as the description proceeds, the invention resides in the combination of parts and in the details of construction hereinafter described and claimed, it being understood that changes may be made in the precise embodiment of the invention herein disclosed, without departing from the spirit of the same.

In the accompanying drawings:—

Figure 1 is an end elevation of an automobile supported upon a railroad flat car by means of the brackets embodying the invention.

Fig. 2 is a side elevation of a vehicle wheel, and the bracket supporting the axle, shown in cross-section.

Fig. 3 is a perspective view of the bracket.

Fig. 4 is a perspective view of a modification of the form of the bracket.

Referring now to the letters of reference placed upon the drawings:—

A, denotes the bracket as a whole. A', A', are legs connected by a cross-member $A^2$. Spaced from the cross-member is an overhanging element $A^3$, forming a hook adapted to receive an axle, or hub B, of a vehicle wheel B'.

The legs A', are provided with feet $A^4$, having holes a, for the passage of bolts C, to secure the device to a supporting platform, or car floor D. E, indicates a bolt extending through holes a', in the walls of the device to secure the axle or hub of the vehicle in its hooked portion:—a plurality of holes being provided that the bolt may be adjusted to adapt the device to receive axles or hubs of varying size.

F, F, are set screws supported in the wall of the bracket coöperating with the bolt E, to insure the vehicle against lateral movement.

F', indicates suitable lock-nuts to secure the set-screws when adjusted.

In the modification shown in Fig. 4 of the drawings the cross-member $A^2$, is arc-shaped, that it may more nearly conform to shape of the axle or hub it is designed to receive and support.

Having indicated the several parts by reference letters, the construction and operation of the device will be readily understood.

Four brackets are bolted to the platform of the car spaced at a suitable distance from each other to receive the vehicle;—the axles or hubs of the latter being respectively held in said brackets by the bolts and set screws provided for that purpose, thereby securing the vehicle against lateral movement, with its tires free from the floor.

Having thus described my invention what I claim is:—

1. In a device of the character described, a supporting element comprising a pair of upwardly extending legs connected by an integral cross-member adapted to support the hub of a vehicle, a hook-shaped element spaced from the cross-member adapted to overlap a hub resting upon said cross-member, a transverse bolt projecting through the said hooked element and cross-member, to confine the hub of a vehicle therein, and a pair of set-screws carried by the hooked portion at right angles to each other, adapted to bear upon said hub to secure the vehicle against lateral movement.

2. In a device of the character described, a bracket comprising a pair of footed legs adapted to be secured to a supporting platform, a cross-member integral with the legs, a superimposed integral hook-shaped element spaced from the cross-member to receive the axle of a vehicle, a transverse bolt extending through holes in the hook-shaped element and cross-members, whereby a vehicle axle may be secured therein, means adapted to provide for the adjustment of said bolt to fit axles of varying size, and suitable set-screws in the wall of the device adapted to bear upon the axle, to secure the vehicle against lateral movement.

In testimony whereof I sign this specification in the presence of two witnesses.

ROBERT E. FEY.

Witnesses:
S. E. THOMAS,
H. J. LIPPMAN.